(12) United States Patent
Kalinsky et al.

(10) Patent No.: US 6,626,072 B1
(45) Date of Patent: Sep. 30, 2003

(54) MULTIPLE SPINDLE MACHINE PLURAL THREADING APPARATUS AND METHOD

(75) Inventors: Robert M. Kalinsky, Broadview Heights, OH (US); Scott W. Stevens, Columbia Station, OH (US)

(73) Assignee: Logan Clutch Corporation, Westlake, OH (US)

( * ) Notice: Subject to any disclaimer, the term of this patent is extended or adjusted under 35 U.S.C. 154(b) by 24 days.

(21) Appl. No.: 09/589,988

(22) Filed: Jun. 7, 2000

(51) Int. Cl.[7] .............................. B23B 7/00; B23B 3/30
(52) U.S. Cl. .............................. 82/1.11; 82/129; 82/118
(58) Field of Search .......................... 82/118, 120, 121, 82/96, 129, 132, 133, 143, 153, 152, 1.11

(56) References Cited

U.S. PATENT DOCUMENTS

| | | | | |
|---|---|---|---|---|
| 4,267,495 A | * | 5/1981 | Wilterdink | 318/571 |
| 4,499,792 A | * | 2/1985 | Tannabe | 74/825 |
| 4,604,560 A | * | 8/1986 | Inagaki et al. | 318/567 |
| 4,655,652 A | * | 4/1987 | Schissler | 409/132 |
| 5,027,680 A | * | 7/1991 | Kohari et al. | 82/1.11 |
| 5,197,363 A | * | 3/1993 | Okachi et al. | 82/118 |
| 5,313,861 A | * | 5/1994 | Ikeda | 82/1.11 |
| 5,730,037 A | * | 3/1998 | Manning | 82/118 |
| 5,808,893 A | * | 9/1998 | Pugh et al. | 364/474.35 |
| 6,050,162 A | * | 4/2000 | Kalinsky | 82/129 |
| 6,125,982 A | * | 10/2000 | Kalinsky | 192/87.15 |

* cited by examiner

*Primary Examiner*—Henry W. H. Tsai
(74) *Attorney, Agent, or Firm*—Ralph E. Jocke; Daniel D. Wasil; Walker & Jocke

(57) ABSTRACT

A dual machining clutch apparatus (10) for a multiple spindle machine has at least two stations (20) for holding work pieces (22, 23). A first machining tool (24) is guided on a first slide (26). A controller (34) is notified that the earlier of the first or second machining tool has reached its selected position for completion of its machining operation. The respective machining clutch is de-energized, allowing its shaft to free-wheel. The later machining tool continues to perform its machining operation. As the later machining tool reaches its selected position for completion, the threading clutch for the earlier machining tool is engaged and the high speed clutch is engaged. The machining tools are then backed off the work piece to return to their original positions. The machining operation is complete and the main drum may index.

20 Claims, 15 Drawing Sheets

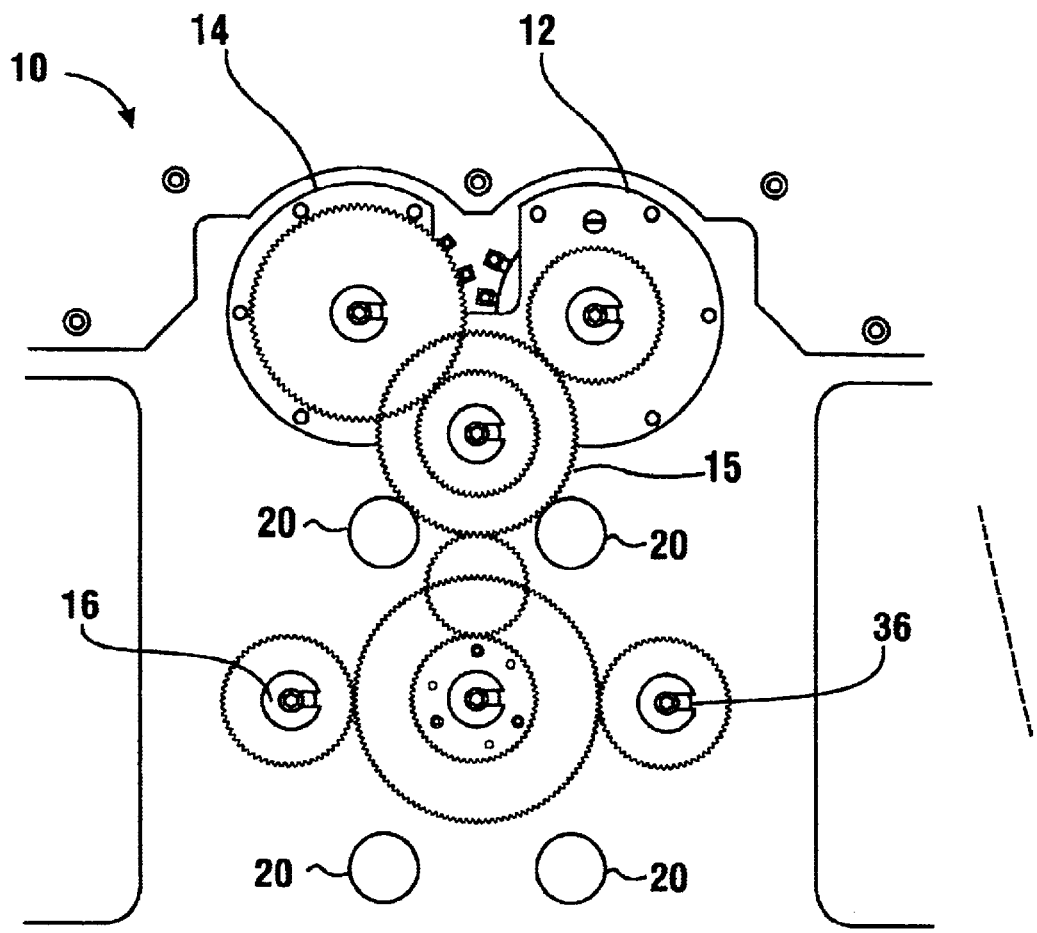
Prior Art - FIG. 1

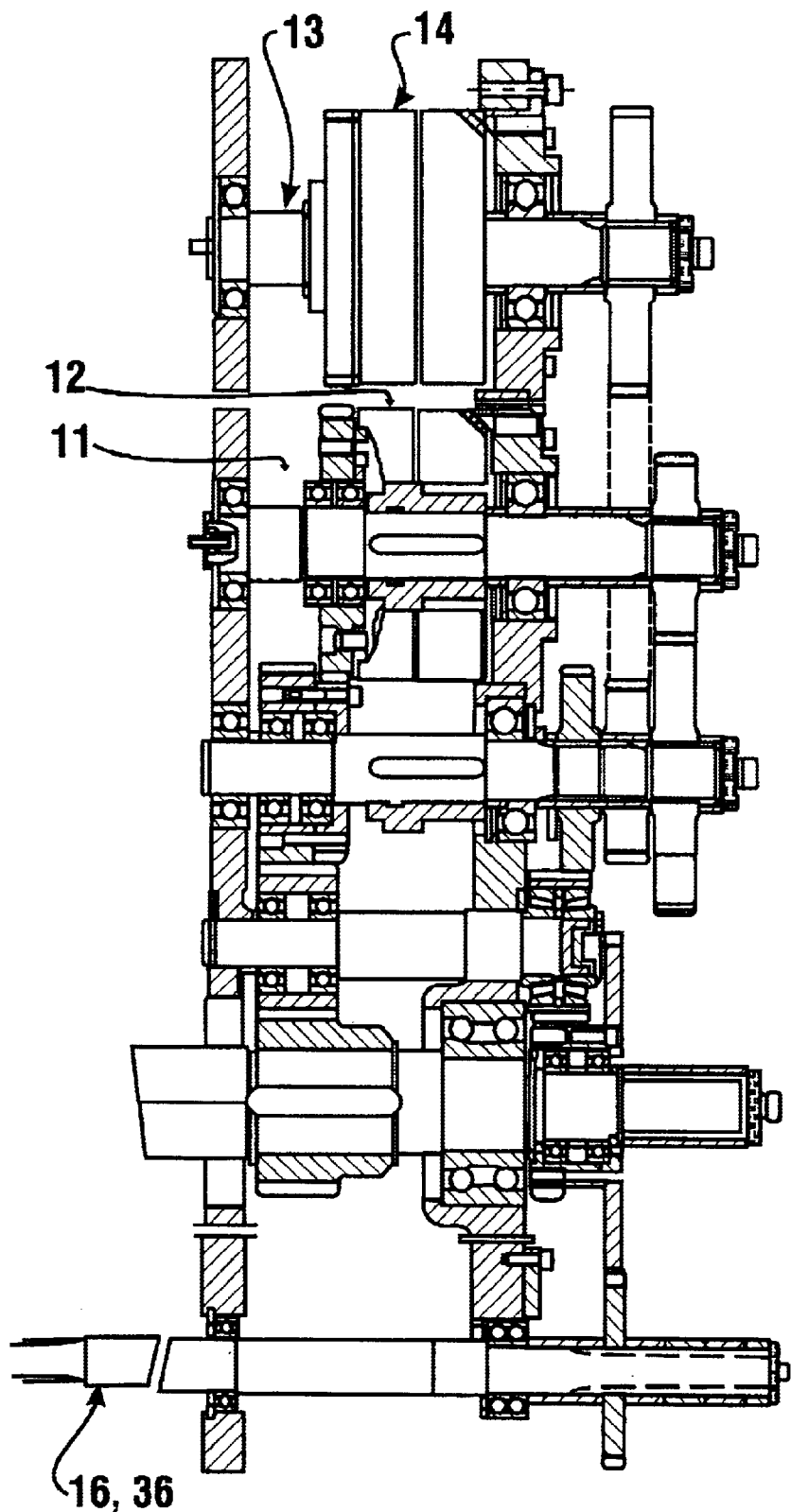
Prior Art - FIG. 2

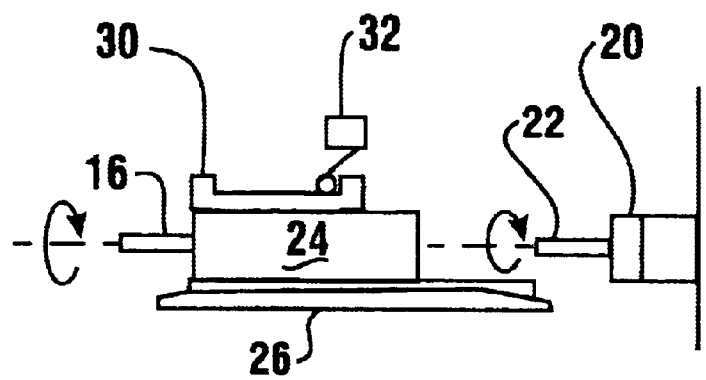
Prior Art - FIG. 3
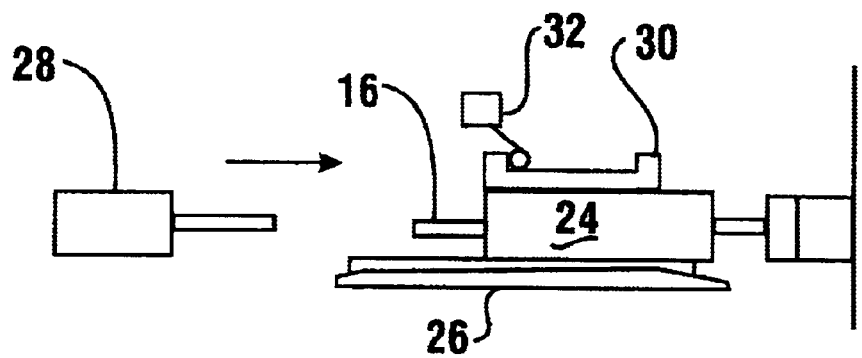
Prior Art - FIG. 4
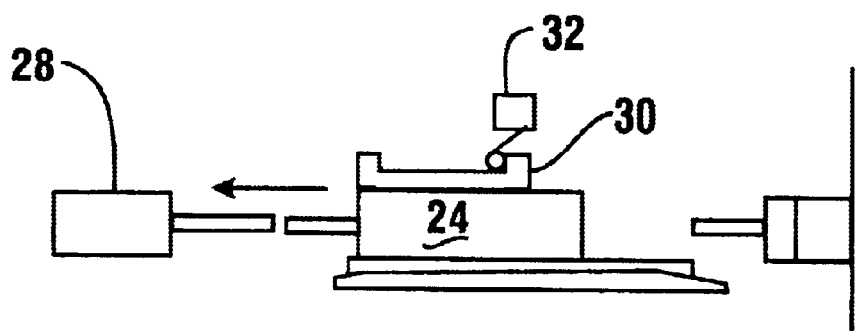
Prior Art - FIG. 5

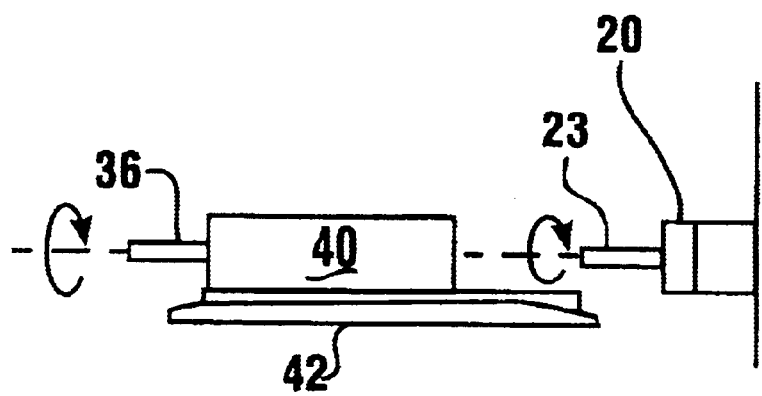
Prior Art - FIG. 3A
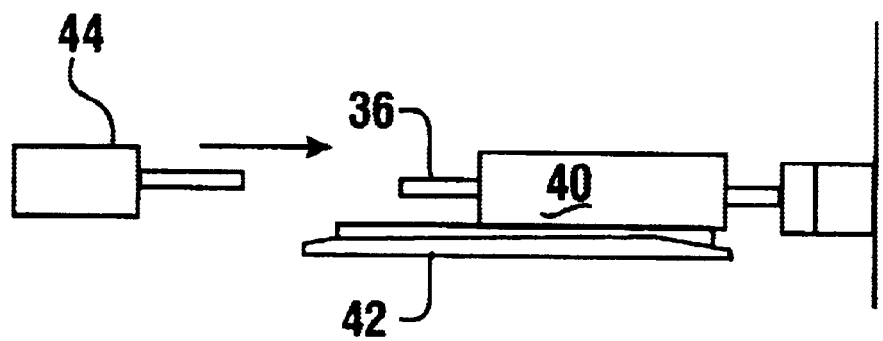
Prior Art - FIG. 4A
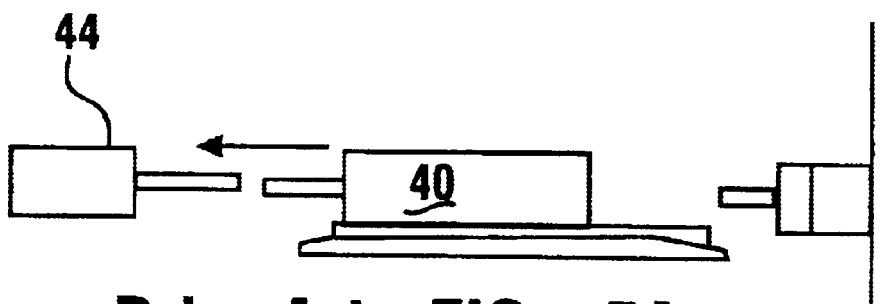
Prior Art - FIG. 5A

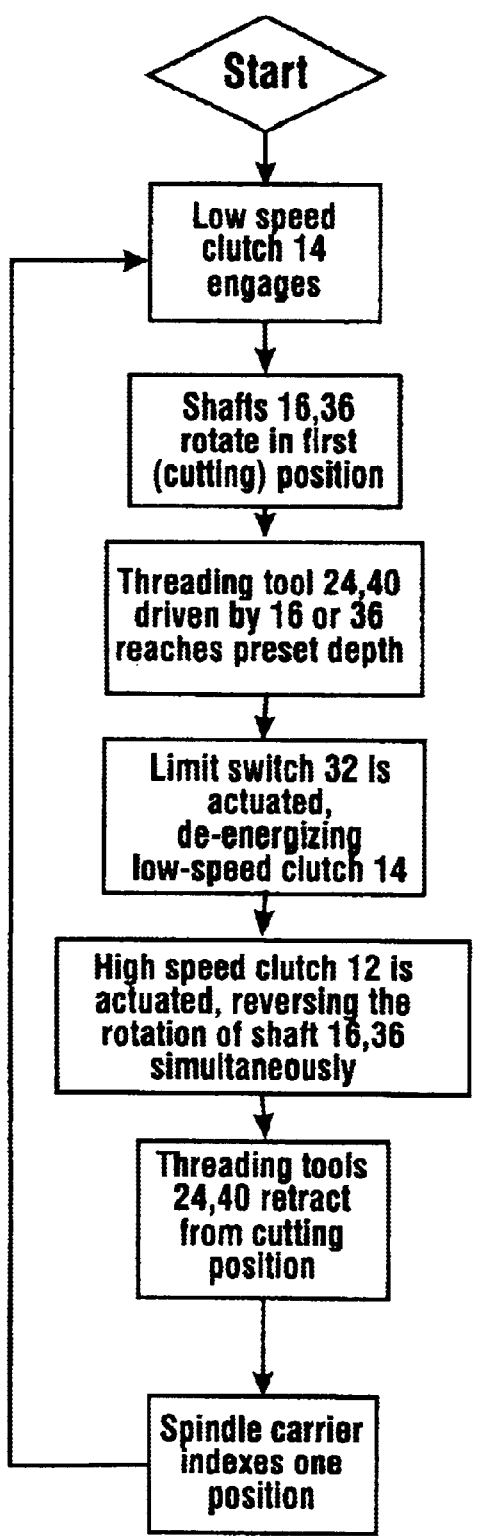
Prior Art - FIG. 6

MULTIPLE SPINDLE MACHINE PLURAL THREADING APPARATUS AND METHOD

TECHNICAL FIELD

This invention relates to multiple spindle machines, and particularly to multiple spindle machines having plural machining capability.

BACKGROUND ART

Multiple spindle machines are known in the prior art. Multiple spindle machines are used to mass produce standardized types of components. Multiple spindle machines typically have several workstations at which machining operations are performed. A piece of raw stock, such as bar stock, enters the machine at a first station and as the machine indexes, various machining operations are performed. Once a station is indexed completely through the machine a completed a part is formed. The part is released and the process is repeated for that station with a new piece of raw stock. The advantage of multiple spindle machines is that all stations in the machine are producing parts simultaneously, resulting in high production.

Multiple spindle machines typically have a large indexing drum with four, six or eight stations thereon. Each of the stations carries a work piece. In all but one of the stations, where a new piece of stock enters, a machining operation is performed. After each operation is completed the drum is rotated so that each work space moves sequentially through the location where the various operation is performed. Machining operations typically performed at a multiple spindle machine include turning and threading.

Most multiple spindle machines are very efficient in terms of producing standardized parts at a high rate. However, one draw back associated with multiple spindle machines is that the entire machine often operates off of a single main motor. The main motor simultaneously drives all the devices in the machine.

The speed of the multiple spindle machine typically changes from high speed to low speed and back again during the course of the operating cycle. High speed is typically used for times in the machine cycle where critical machining operations are not occurring. High speed operation is desirable when the machines are indexing or when the tools are moving to or away from the work pieces that are not performing work thereon. Low speed operation is used when the tools in the machine are forming the metal. As stated, the machining operation of the bar stock is performed utilizing a threading die which is driven via a worm gear. In typical multiple spindle machines a worm gear is driven through a threading clutch. The threading clutch acts to translate rotation from a reversible shaft to the threading shaft.

As previously described a typical prior art multiple spindle machine includes a main drive motor which operates all of the components on the multiple spindle machine that perform machining operations on the work pieces through a transmission.

The transmission includes various components including a high speed clutch and a low speed clutch. A rear view of a typical multiple spindle machine set up for a dual threading operation is shown in FIG. 1 and has a high speed clutch 12 and a low speed clutch 14. FIG. 2 is a side view of the multiple spindle machine shown in FIG. 1.

A high speed clutch shaft 11 extends along a longitudinal direction in operative connection with a main motor (not shown) of the multiple spindle machine and may be rotated in either a first or second direction to drive high speed clutch 12 in either the first or second direction. A low speed clutch shaft 13 extends along a longitudinal direction in operative connection with the main motor and may be rotated in either a first or second direction to drive low speed clutch 14 in either the first or second direction.

Work pieces formed in the multiple spindle machine are carried on six stations 20 located on a main spindle carrying drum (not shown), two of the six stations 20 being utilized for threading operations in this set up, which will be described below without reference to the other machining operations.

The high and low speed clutches are selectively actuated to drive through a gear train 15 first shaft 16 and second shaft 36 at either a high or a low speed. High speed is used when machining operations are not occurring, such as when the machine is indexing or when the tools are moving to or away from the work pieces. Low speed operation is used when the tools in the machine are machining the work piece.

Stations consist of rotatable spindles through which work piece stock, such as bar stock, extends. Raw stock enters the machine at a first position then indexes through each of the other five stations so that a completed part is produced and cut off before the drum returns to the first position.

A station 20 is schematically shown holding a work piece 22 in FIG. 3. Similarly a second station 20 holds a second work piece 23 as shown in FIG. 3A. The work pieces are held in collets in the spindle and rotate in the direction of the arrow as shown. When the low speed clutch 14 is engaged, the output shafts 16, 36 will rotate in the same direction as the work pieces. The high speed clutch 12 is engaged once the threads-have been formed. The threading tool is then backed off the work piece.

The threading process for the first threading tool is illustrated schematically in FIGS. 3–4. A first threading tool 24 is guided on a first slide 26. A switch actuator 30 is attached to the threading tool 24. The first threading tool is shown in the fully retracted position shown in FIG. 3. The switch actuator engages a limit switch 32 so as to indicate that the first threading tool is in the fully retracted position. As the multiple spindle machine cycles, first threading tool 24 is moved to engage first work piece 22 by movement on first slide 26 using an actuator such as first pneumatic cylinder 28. The threading tool moves to engage the work piece until the limit switch 32 is moved to the fully forward, full stroke position by the switch actuator 30 as shown in FIG. 4.

The threading process for the second threading tool is illustrated schematically in FIGS. 3A–4A. A second threading tool 40 is guided on a second slide 42. As the multiple spindle machine cycles, second threading tool 40 is moved to engage second work piece 23 by movement on second slide 42 using an actuator such as a second pneumatic cylinder 44. The second threading tool moves to engage the second work piece until limit switch 32 has moved to the fully forward, full stroke position of first threading tool 24 by the switch actuator 30 as shown in FIG. 4.

When first threading tool 24 has been moved to the fully forward position as shown in FIG. 4, the actuator 30 changes direction in response to control signals to return the first and second threading tools to their original positions. The switch actuator 30 engages the limit switch 32 to indicate that the first threading tool 24 is again in the fully retracted position as shown in FIG. 5, the threading operation is complete and the threading tools are sufficiently disposed from the work pieces and spindle so that the main drum may index.

The second threading tool 40 does not have a switch actuator to engage a limit switch so as to indicate that the second threading tool is in either the fully forward or the fully retracted position. The multiple spindle machine is set up based on both threading operations being completed simultaneously. Use of a second limit switch and switch actuator combination would be redundant when the machine operates correctly. Also, unintended operation could occur if a second actuator and switch combination sent a completion signal rather than the first. A flow diagram of the threading operation is shown in FIG. 6.

All of the stations rotate the work pieces in the same direction and all of the machining operations occur generally simultaneously. There are several problems associated with the design and operation of the prior art multiple spindle machines in which threading simultaneously at a plurality of stations has been attempted. Threading operations must be started and finished generally simultaneously with each other and with the other machining operations so that all start and finish simultaneously with each other and the other operations for the drum to index to the next position. As described above, only one limit switch 32 is used to indicate that both threading tools 24, 40 are in the fully forward, full stroke position. The machine operator must set up the switch actuator 30 and limit switch 32 so that threading tools 24, 40 have completed their threading operations when the switch is activated.

Electromagnetic clutches have been used as the high and low speed clutches to obtain improved synchronization, but they provide sufficient torque only to tap threads in small stock of soft materials such as aluminum or brass. A problem occurs with a lack of static torque capacity produced by the electromagnetic clutches. Replacing electromagnetic clutches with pneumatic clutches increases torque by approximately 50%, thereby increasing plural threading capability. However, a problem occurs with pneumatic clutches in that the threading operations is more difficult to synchronize sufficiently. Long set up times are common, resulting in lost production time and generation of unusable scrap pieces.

Thus there exists a need in for a multiple spindle machine with plural threading capability which reliably simultaneously and synchronously threads bar stock of desired material and size.

DISCLOSURE OF THE INVENTION

The object of the present invention is to provide a multiple spindle machine plural machining apparatus and method.

A further object of the present invention is to provide a multiple spindle machine plural machining apparatus and method in which the torque capacity is sufficient to facilitate the use of plural machining tools.

A further object of the present invention is to provide a multiple spindle machine plural machining apparatus and method in which the machining tools which finish their operations idle until the last tool finishes its operation.

A further object of the present invention is to provide a multiple spindle machine plural machining apparatus and method which reduces the need for precisely coordinated machine settings and reduces machine set up time.

A further object of the present invention is to provide a multiple spindle machine plural machining apparatus and method which reduces material stock waste during machine set up.

A further object of the present invention is to provide a multiple spindle machine plural machining apparatus and method which can be retrofit to existing multiple spindle machines.

Further objects of the present invention will be made apparent from the following Best Modes for Carrying Out Invention and the appended claims.

The foregoing objects are accomplished in the preferred embodiment of the present invention by a plural machining apparatus and method for a multiple spindle machine.

The invention has alternative embodiments, each permitting increased torque and independent thread tapping at low speed followed by simultaneous withdrawal at high speed of the taps from the work piece.

In the first embodiment the machining attachments are pneumatic threading clutches at two of the stations of the multiple spindle machine. The threading clutches operatively engage threading tools at low speed to tap work pieces. When the first tool has reached its fully forward, full stroke position, its pneumatic clutch disengages to allow its tool to idle until the second tool has reached its fully forward, full stroke position, whereupon its pneumatic clutch disengages and signals a high speed clutch to engage and withdraw both tools.

In the second embodiment separate servo motors at two stations each rotate threading tools. When the first threading tool has reached its fully forward, fill stroke position, its servo motor idles until the second tool has reached its fully forward, full stroke position, and signals for withdrawal of both tools.

The plural threading apparatus and method further comprises a limit switch and switch actuator combination for each threading tool to signal completion of the threading operation.

The plural threading apparatus and method further comprises a controller to determine when threading is complete.

BRIEF DESCRIPTION OF DRAWINGS

FIG. 1 is a rear view of a section of a central gear box of a multiple spindle machine of the prior art with two positions used for a dual threading operation.

FIG. 2 is a partial cut away side view of the central gear box of FIG. 1.

FIG. 3 is a schematic view of a threading spindle and slide used to thread a work piece according to the prior art.

FIG. 4 is a schematic view of a threading spindle and slide used to thread a work piece according to the prior art.

FIG. 5 is a schematic view of a threading spindle and slide used to thread a work piece according to the prior art.

FIG. 3A is a schematic view of a threading spindle and slide used to thread a work piece according to the prior art.

FIG. 4A is a schematic view of a threading spindle and slide used to thread a work piece according to the prior art.

FIG. 5A is a schematic view of a threading spindle and slide used to thread a work piece according to the prior art.

FIG. 6 is a flow diagram of the threading operation shown in FIG. 3–5.

BEST MODES FOR CARRYING OUT INVENTION

Figure 7:
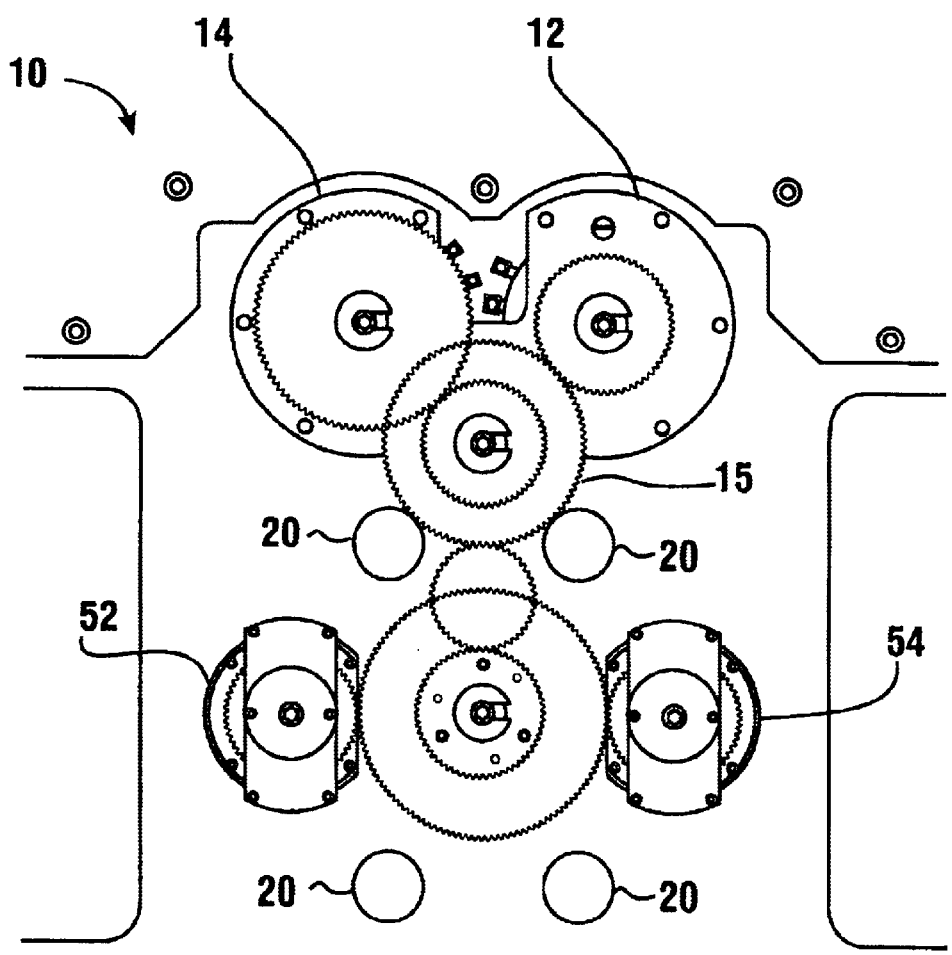
FIG. 7 is a rear view of a section of a central gear box with two positions used for a dual threading operation of an exemplary embodiment of the present invention.
Figure 8:
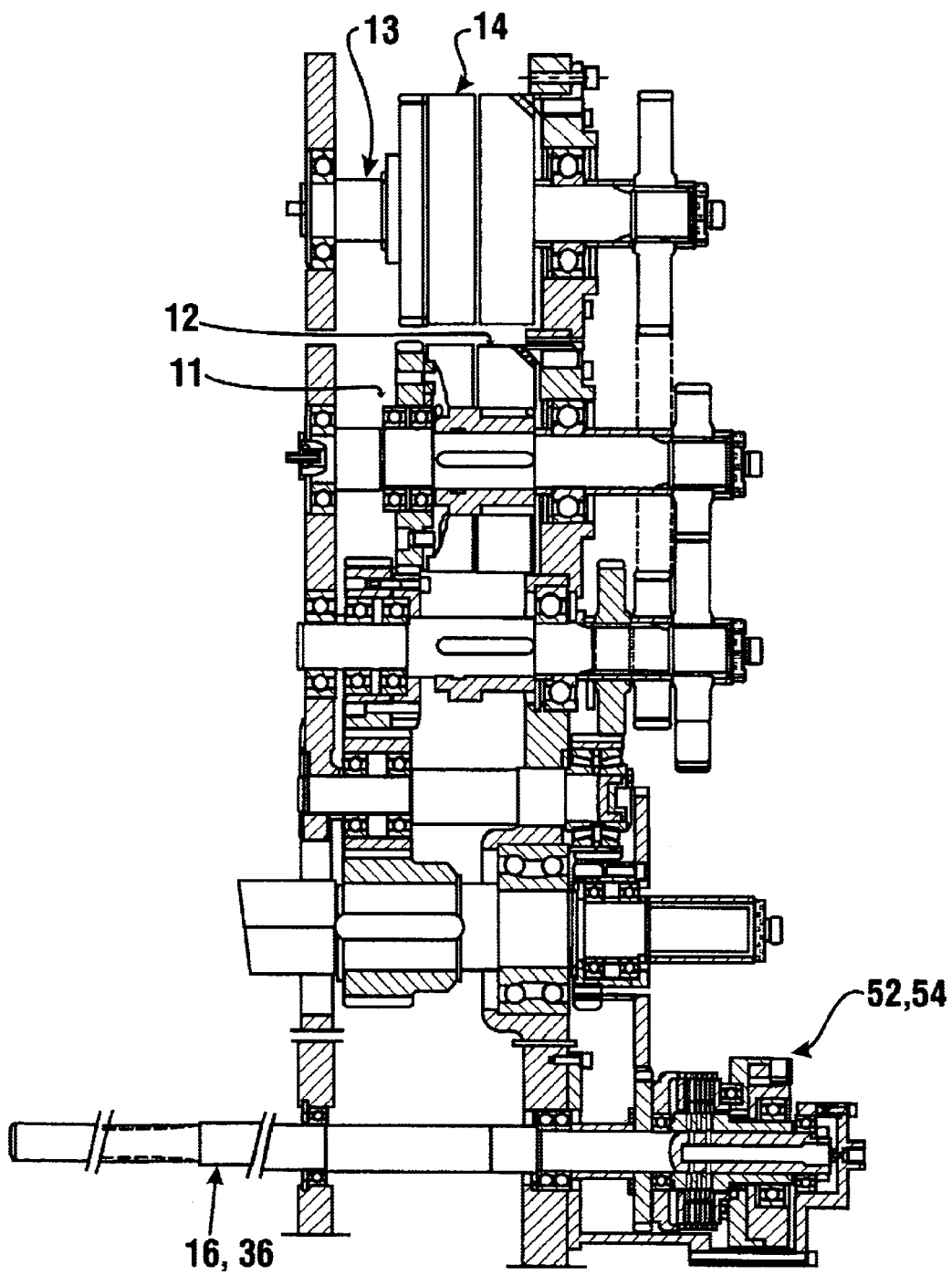
FIG. 8 is a partial cut away side view of the central gear box of FIG. 7.

Referring now to the drawings and particularly to FIGS. 7 and 8, there is shown a multiple spindle machine dual threading apparatus and method of an exemplary embodiment of the present invention.

As previously described for the prior art multiple spindle machine, the multiple spindle machine plural threading apparatus and method of the present invention includes a main drive motor which operates all of the components on the multiple spindle machine that perform machining operations on the work pieces through a transmission.

The transmission includes various components including a high speed clutch and a low speed clutch. A rear view of a typical multiple spindle machine set up for a dual threading operation is shown in FIG. 7 and has a high speed clutch 12 and a low speed clutch 14. FIG. 8 is a side view of the multiple spindle machine shown in FIG. 7.

A high speed clutch shaft 11 extends along a longitudinal direction in operative connection with a main motor (not shown) of the multiple spindle machine and may be rotated in either a first or second direction to drive high speed clutch 12 in either the first or second direction. A low speed clutch shaft 13 extends along a longitudinal direction in operative connection with the main motor and may be rotated in either a first or second direction to drive low speed clutch 14 in either the first or second direction.

Work pieces formed in the multiple spindle machine are carried on six stations 20 located on a main spindle carrying drum (not shown), two of the six stations 20 being utilized for threading operations in a machine set up for dual threading, which will be described below without reference to the other machining operations. It should be understood that three or more threading or other machining operations may also be accomplished using the present invention.

The high and low speed clutches are selectively actuated to drive through a gear train 15 first shaft 16 through a first machining clutch 52, such as a threading clutch, and second shaft 36 through a second machining clutch 54, such as a threading clutch, at either a high or a low speed. First threading clutch 52 is operative to engage and disengage first shaft 16 and second threading clutch 54 is operative to engage and disengage second shaft 36. High speed is used when machining operations are not occurring, such as when the machine is indexing or when the tools are moving to or away from the work pieces. Low speed operation is used when the tools in the machine are machining the work piece.

Stations consist of rotatable spindles through which work piece stock, such as bar stock, extends. Raw stock enters the machine at a first position then indexes through each of the other five stations so that a completed part is produced and cut off before the drum returns to the first position.

Figure 9:
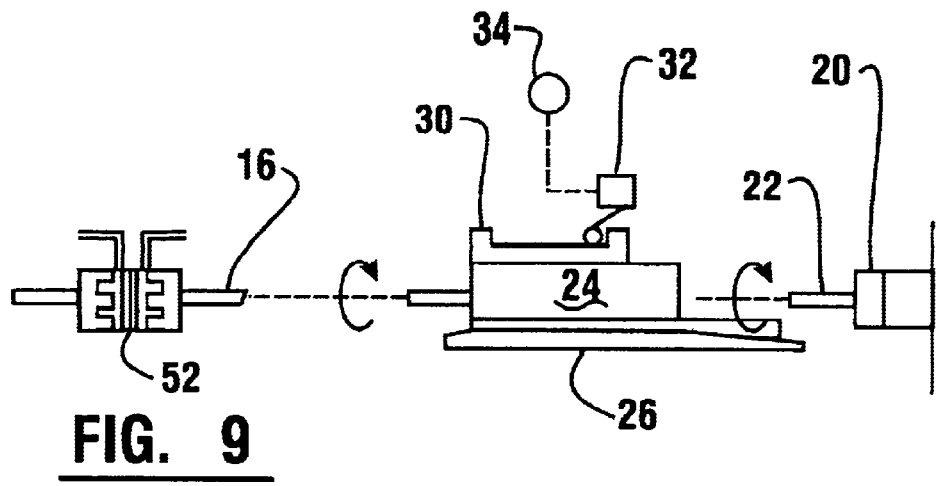
FIG. 9 is a schematic view of a threading spindle and slide used to thread a work piece according to an exemplary embodiment of the present invention.
Figure 9A:
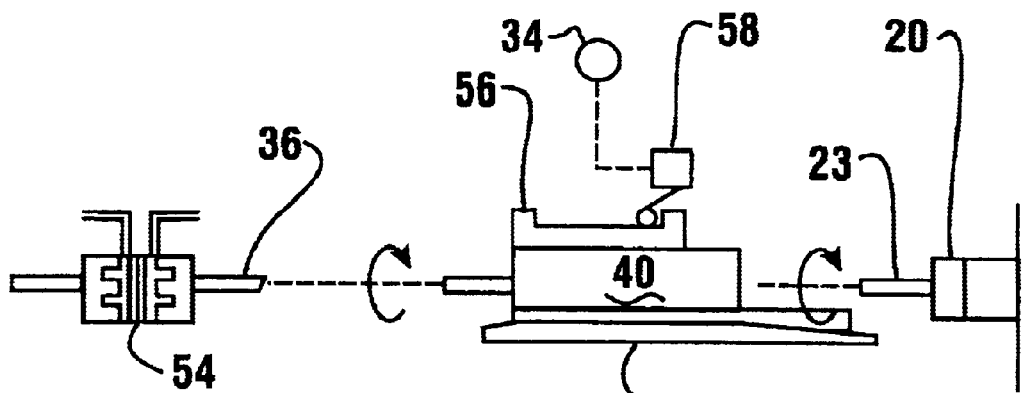
FIG. 9A is a schematic view of a threading spindle and slide used to thread a work piece according to an exemplary embodiment of the present invention.

A station 20 is schematically shown holding a work piece 22 in FIG. 9. Similarly a second station 20 holds a second work piece 23 as shown in FIG. 9A. The work pieces are held in collets in the spindle and rotate in the direction of the arrow as shown. When the low speed clutch 14 is engaged and the first and second threading clutches 52, 54 are engaged, the output shafts 16, 36 rotate in the same direction as the work pieces to cut threads in the work pieces.

Figure 10:
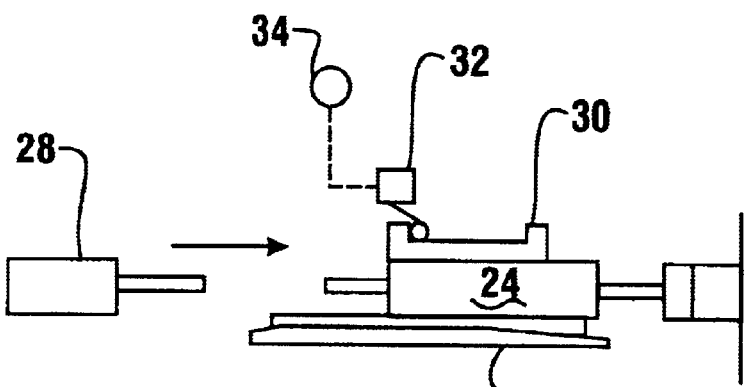
FIG. 10 is a schematic view of a threading spindle and slide used to thread a work piece according to an exemplary embodiment of the present invention.

The threading process for the first threading tool is illustrated schematically in FIGS. 9–10. A first machining tool 24, such as a threading tool, is guided on a first slide 26. A switch actuator 30 is attached to the threading tool 24. The first threading tool is shown in the fully retracted position shown in FIG. 9. The switch actuator 30 engages a limit switch 32 so as to indicate that the first threading tool is in the fully retracted position. It can be appreciated that other detector or position sensing devices may be used to determine a selected position of the machining tool in place of the switch actuator and limit switch. As the multiple spindle machine cycles, first threading tool 24 is moved to engage first work piece 22 by movement on first slide 26 using an actuator such as first pneumatic cylinder 28. The threading tool moves to engage the work piece until the limit switch 32 is moved to the fully forward, full stroke position by the switch actuator 30 as shown in FIG. 10. A signal is sent to a controller 34 indicating that threading tool 24 has reached this position.

Figure 10A:
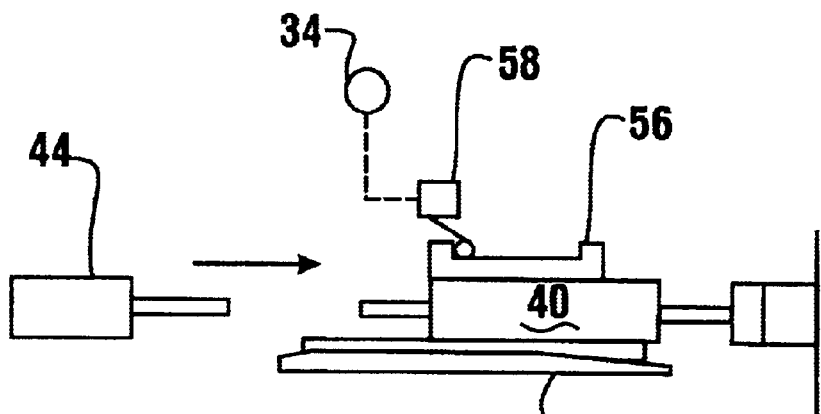
FIG. 10A is a schematic view of a threading spindle and slide used to thread a work piece according to an exemplary embodiment of the present invention.

The threading process for the second threading tool is illustrated schematically in FIGS. 9A–10A. A second machining tool 40, such as a threading tool, is guided on a second slide 42. As the multiple spindle machine cycles, second threading tool 40 is moved to engage second work piece 23 by movement on second slide 42 using an actuator such as a second pneumatic cylinder 44. The second threading tool moves to engage the second work piece until limit a second limit switch 58 has moved to the fully forward, full stroke position of second threading tool 40 by the switch actuator 56 as shown in FIG. 10A. A signal is sent to a controller 34 indicating that second threading tool 40 has reached this position.

Figure 11:
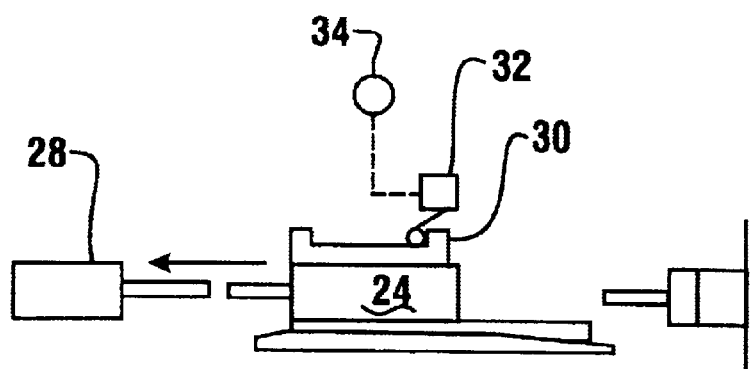
FIG. 11 is a schematic view of a threading spindle and slide used to thread a work piece according to an exemplary embodiment of the present invention.
Figure 11A:
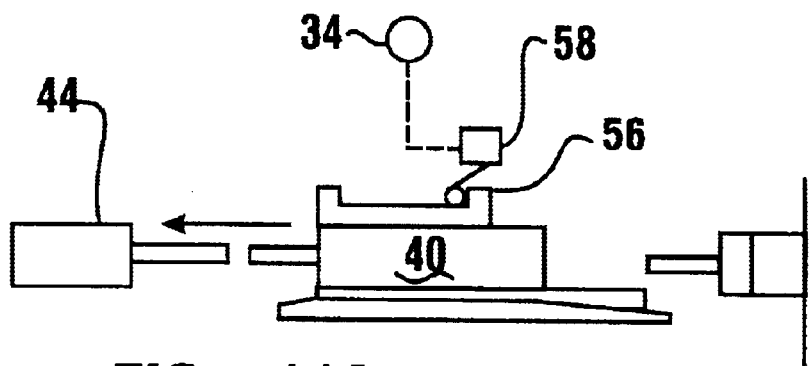
FIG. 11A is a schematic view of a threading spindle and slide used to thread a work piece according to an exemplary embodiment of the present invention.

As the earlier of either first or second threading tool 24, 40 reaches its selected depth for thread formation as shown in FIGS. 10 and 10A, the respective switch actuator 30, 56 engages its limit switch 32, 58 to signal controller 34 that the earlier threading tool has reached its selected depth for thread formation. The respective threading clutch 52, 54 is disengaged responsive to a signal from controller 34 allowing its respective shaft 16, 36 to free-wheel. The later threading tool continues to cut to its selected depth for thread formation. As the later threading tool reaches its selected depth for thread formation, responsive to a signal from controller 34 the threading clutch for the earlier threading tool is engaged and the high speed clutch 12 is engaged. The threading tools are then backed off the work piece to return the first and second threading tools to their original positions as shown in FIGS. 11 and 11A. The threading operation is complete and the threading tools are sufficiently disposed from the work pieces and spindle so that the main drum may index.

Figure 12:
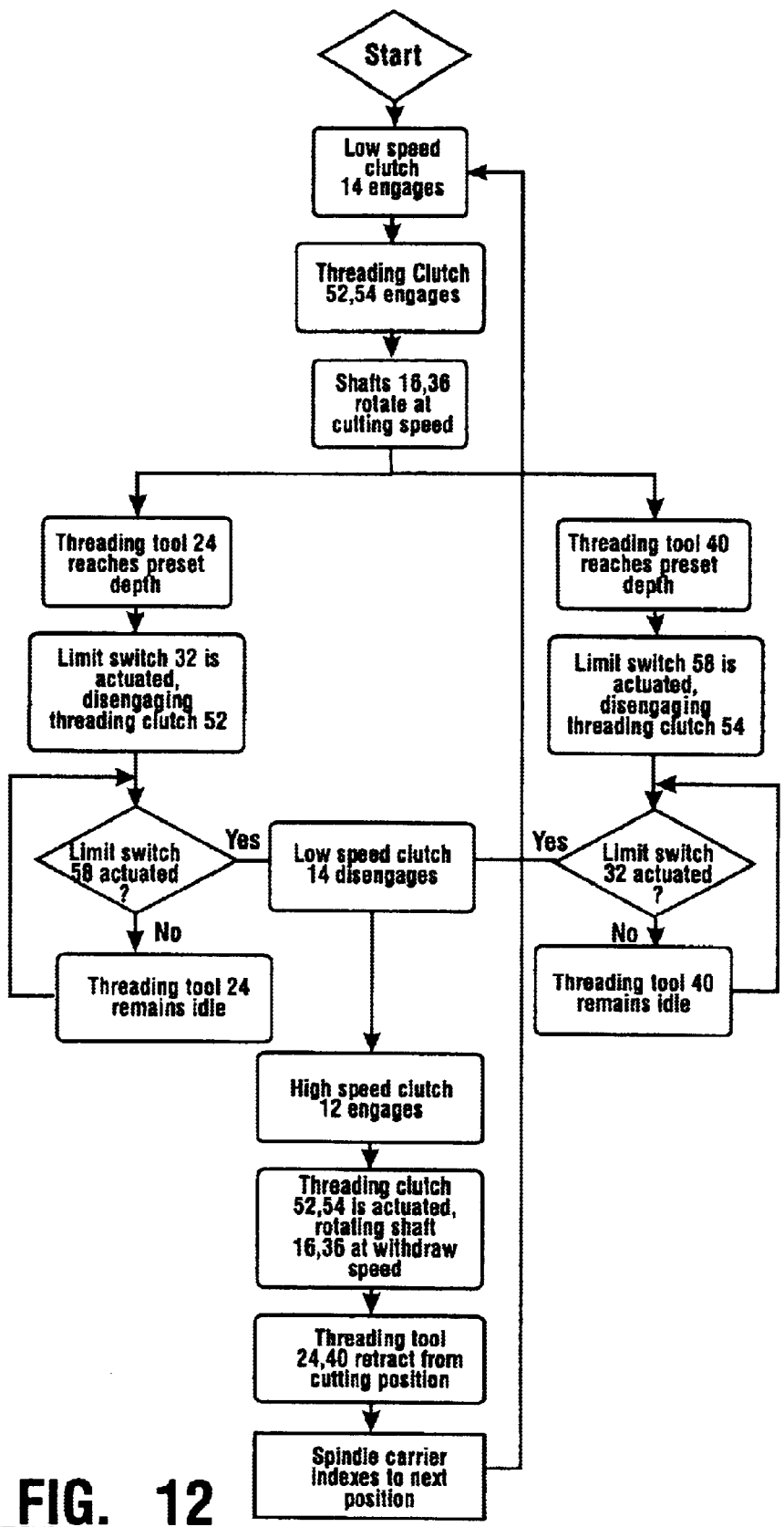
FIG. 12 is a flow diagram of the threading operation shown in FIGS. 9–11 and 9A–11A.

Both threading tools 24, 40 have a switch actuator to engage a limit switch so as to indicate that each threading tool is in either the fully forward or the fully retracted position. The multiple spindle machine is set up based on both threading operations being completed approximately simultaneously, but without the need for extreme precision required in the prior art. Additionally, as the threading tools wear, they will typically wear at different rates, but will not require adjustment of the machine to continue its operation. A flow diagram of the threading operation is shown in FIG. 12.

Figure 13:
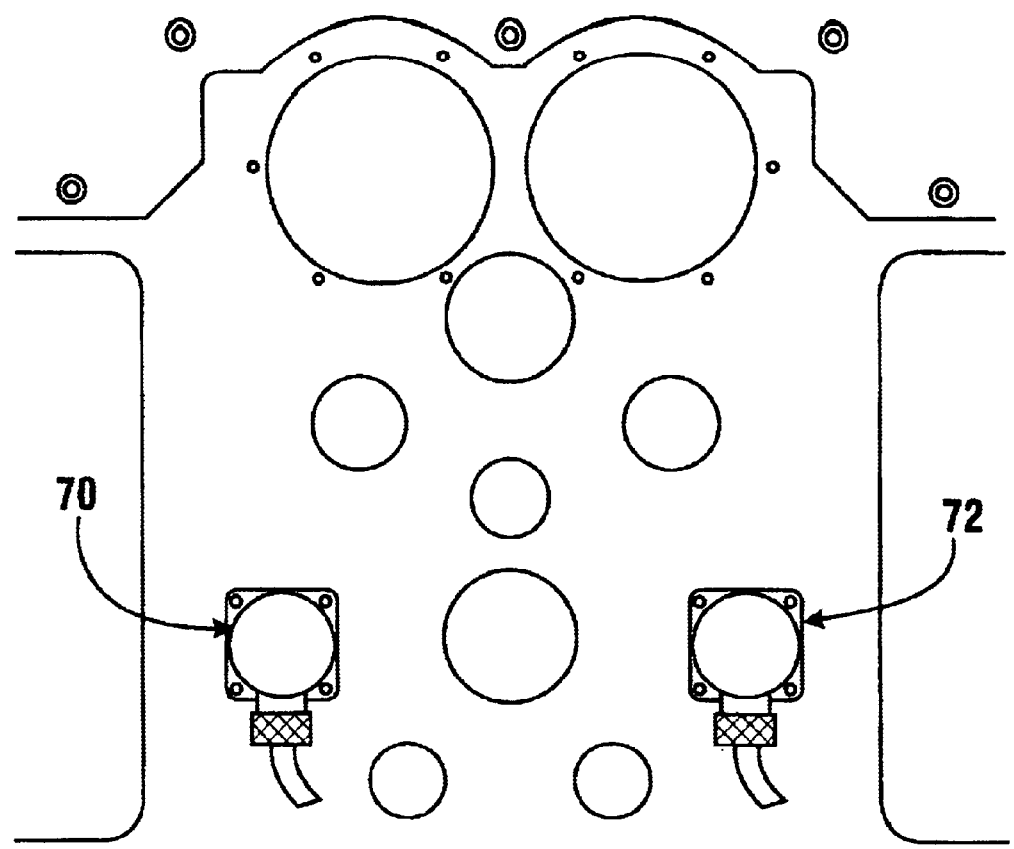
FIG. 13 is a rear view of a section of a central gear box with two positions using servo motors for a dual threading operation in an alternative embodiment of the present invention.
Figure 14:
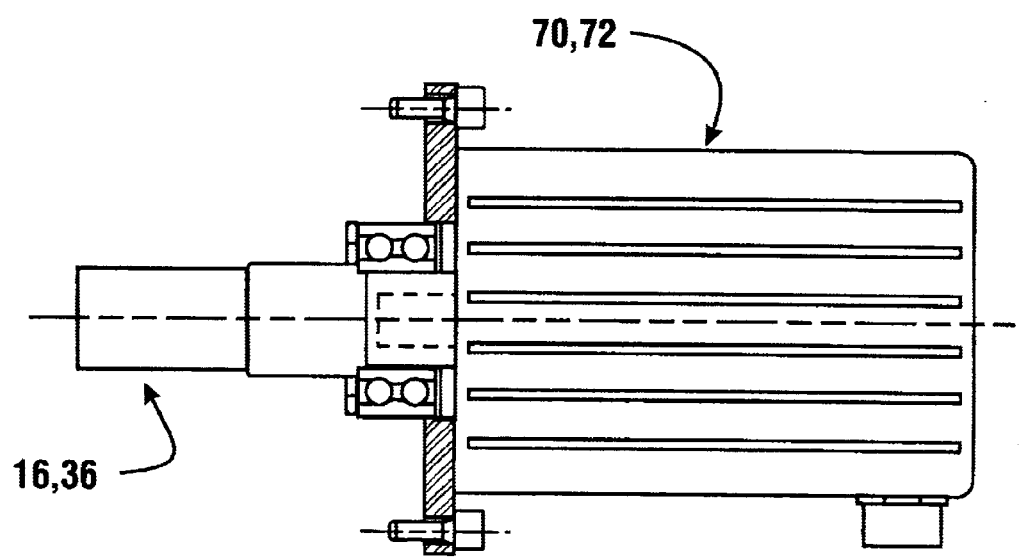
FIG. 14 is a side view of a servo motor and shaft of an alternative embodiment of the present invention.

In an alternative embodiment servo motors are used in place of the threading clutches as the threading attachment of the previous embodiment. A servo motor is in operative engagement with a threading tool when energized. A servo motor is operatively disengaged from a threading tool when de-energized. Therefore, a servo motor is selectively operative to engage and disengage a threading tool. The servo motors operatively engage or drive threading tools at low speed to tap work pieces. When the earlier of the first or second threading tool reaches its fully forward, full stroke position, its servo motor disengages responsive to a signal from controller 34 to allow its tool to idle. The later of the first or second threading tool continues to cut until it has reached its fully forward, fall stroke position. When the later tool has reached its fully forward, full stroke position, the servo motor for the earlier threading tool engages responsive to a signal from controller 34 and both tools are withdrawn. FIGS. 13 and 14 show servo motors 70, 72.

As described above for the first embodiment, stations consist of rotatable spindles through which work piece stock, such as bar stock, extends. Raw stock enters the machine at a first position then indexes through each of the other five stations so that a completed part is produced and cut off before the drum returns to the first position.

Figure 15:
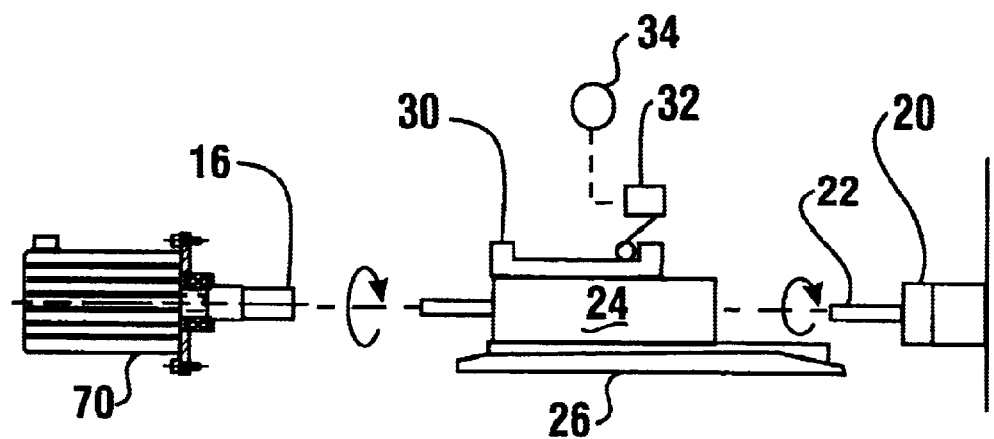
FIG. 15 is a schematic view of a threading spindle and slide used to thread a work piece according to an alternative embodiment of the present invention.
Figure 16:
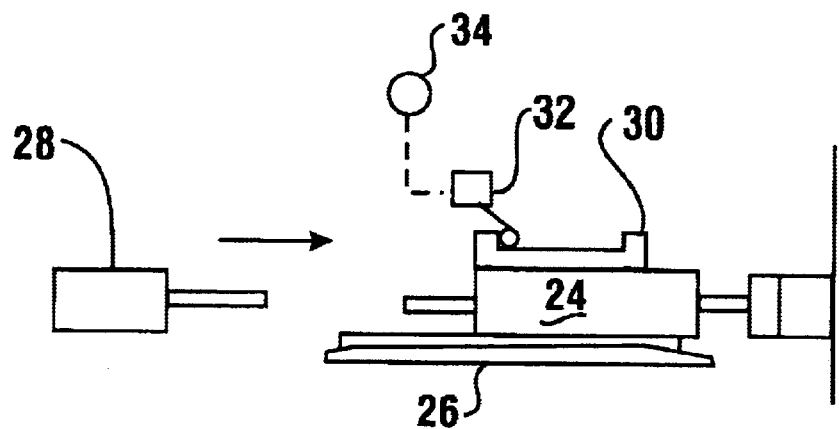
FIG. 16 is a schematic view of a threading spindle and slide used to thread a work piece according to an alternative embodiment of the present invention.
Figure 15A:
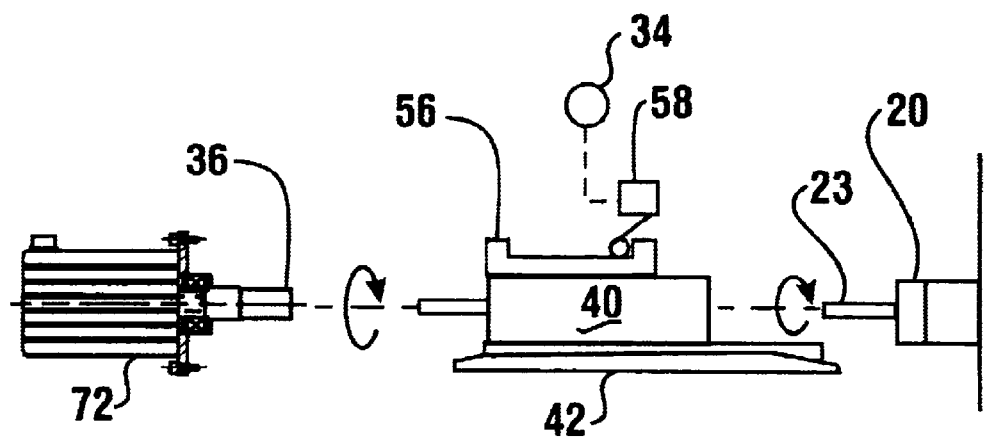
FIG. 15A is a schematic view of a threading spindle and slide used to thread a work piece according to an alternative embodiment of the present invention.

A station 20 is schematically shown holding a work piece 22 in FIG. 15. Similarly a second station 20 holds a second work piece 23 as shown in FIG. 15A. The work pieces are held in collets in the spindle and rotate in the direction of the arrow as shown. When the first and second servo motors 70, 72 are engaged, the output shafts 16, 36 rotate in the same direction as the work pieces to cut threads in the work pieces. The threading process for the first threading tool is illustrated schematically in FIGS. 15–17. A first threading tool 24 is guided on a first slide 26. A switch actuator 30 is attached to the threading tool 24. The first threading tool is shown in the fully retracted position shown in FIG. 15. The switch actuator engages a limit switch 32 so as to indicate that the first threading tool is in the fully retracted position. As the multiple spindle machine cycles, first threading tool 24 is moved to engage first work piece 22 by movement on first slide 26 using an actuator such as first pneumatic cylinder 28. The threading tool moves to engage the work piece until the limit switch 32 is moved to the fully forward, full stroke position by the switch actuator 30 as shown in FIG. 16. It can be appreciated that other position sensing devices may be used in place of the switch actuator and limit switch. A signal is sent to a controller 34 indicating that threading tool 24 has reached this position.

Figure 16A:
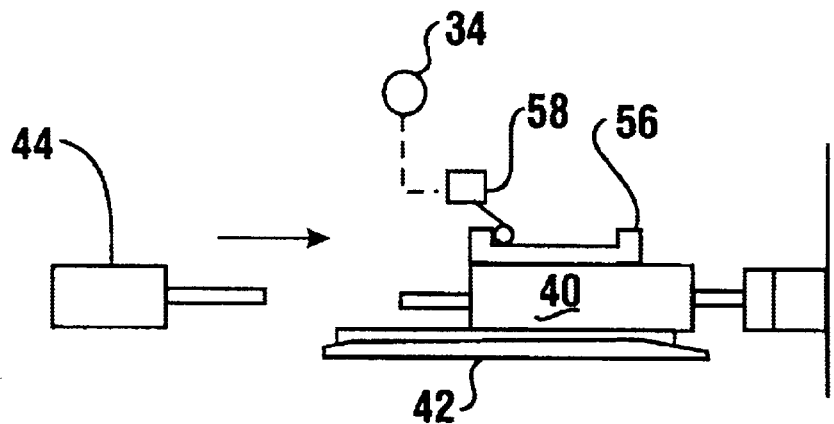
FIG. 16A is a schematic view of a threading spindle and slide used to thread a work piece according to an alternative embodiment of the present invention.

The threading process for the second threading tool is illustrated schematically in FIGS. 15A–17A. A second threading tool 40 is guided on a second slide 42. As the multiple spindle machine cycles, second threading tool 40 is moved to engage second work piece 23 by movement on second slide 42 using an actuator such as a second pneumatic cylinder 44. The second threading tool moves to engage the second work piece until a second limit switch 58 has moved to the fully forward, full stroke position of first threading tool 24 by the switch actuator 56 as shown in FIG. 16A. A signal is sent to a controller 34 indicating that threading tool 40 has reached this position.

Figure 17:
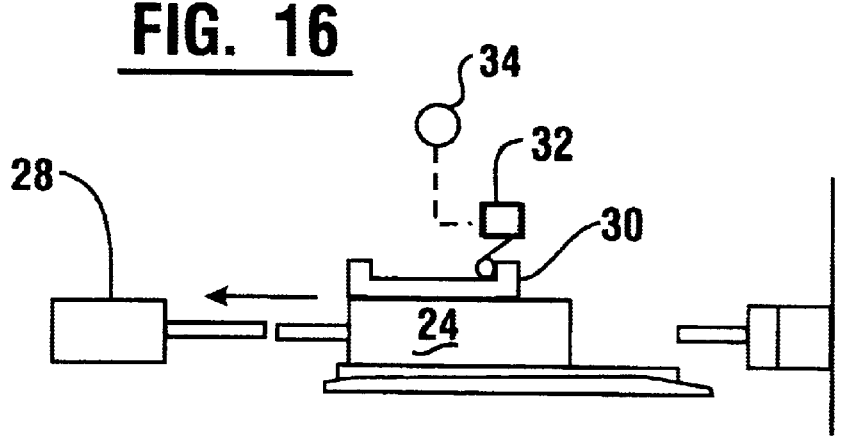
FIG. 17 is a schematic view of a threading spindle and slide used to thread a work piece according to an alternative embodiment of the present invention.
Figure 17A:
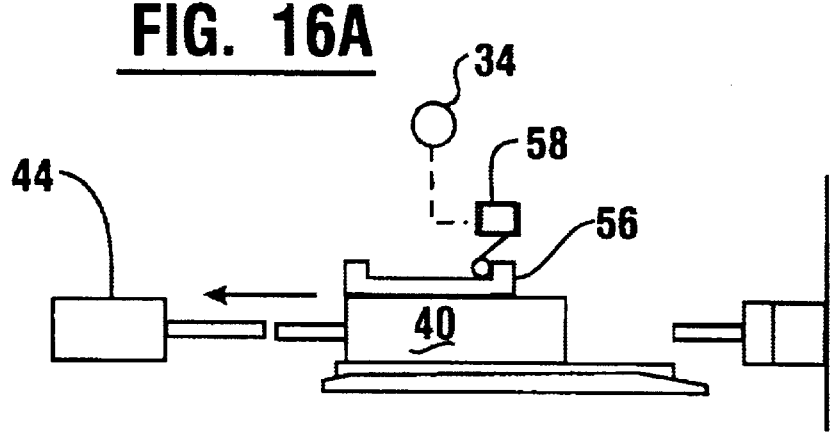
FIG. 17A is a schematic view of a threading spindle and slide used to thread a work piece according to an alternative embodiment of the present invention.

As the earlier of either first or second threading tool 24, 40 reaches its selected depth for thread formation as shown in FIGS. 16 and 16A, the respective switch actuator 30, 56 engages its limit switch 32, 58 to signal controller 34 that the earlier threading tool has reached its selected depth for thread formation. The respective servo motor 70, 72 is de-energized, allowing its threading tool to free-wheel with its shaft. Alternatively, the servo motor may rotate at the same speed as the spindle and the work piece so that no further threading is performed. The later 13 threading tool continues to cut to its selected depth for thread formation. As the later threading tool reaches its selected depth for thread formation, a signal is sent to controller 34 and the servo motor for the earlier threading tool is energized. The threading tools are then backed off the work piece to return the first and second threading tools to their original positions as shown in FIGS. 17 and 17A. The threading operation is complete and the threading tools are sufficiently disposed from the work pieces and spindle so that the main drum may index.

Figure 18:
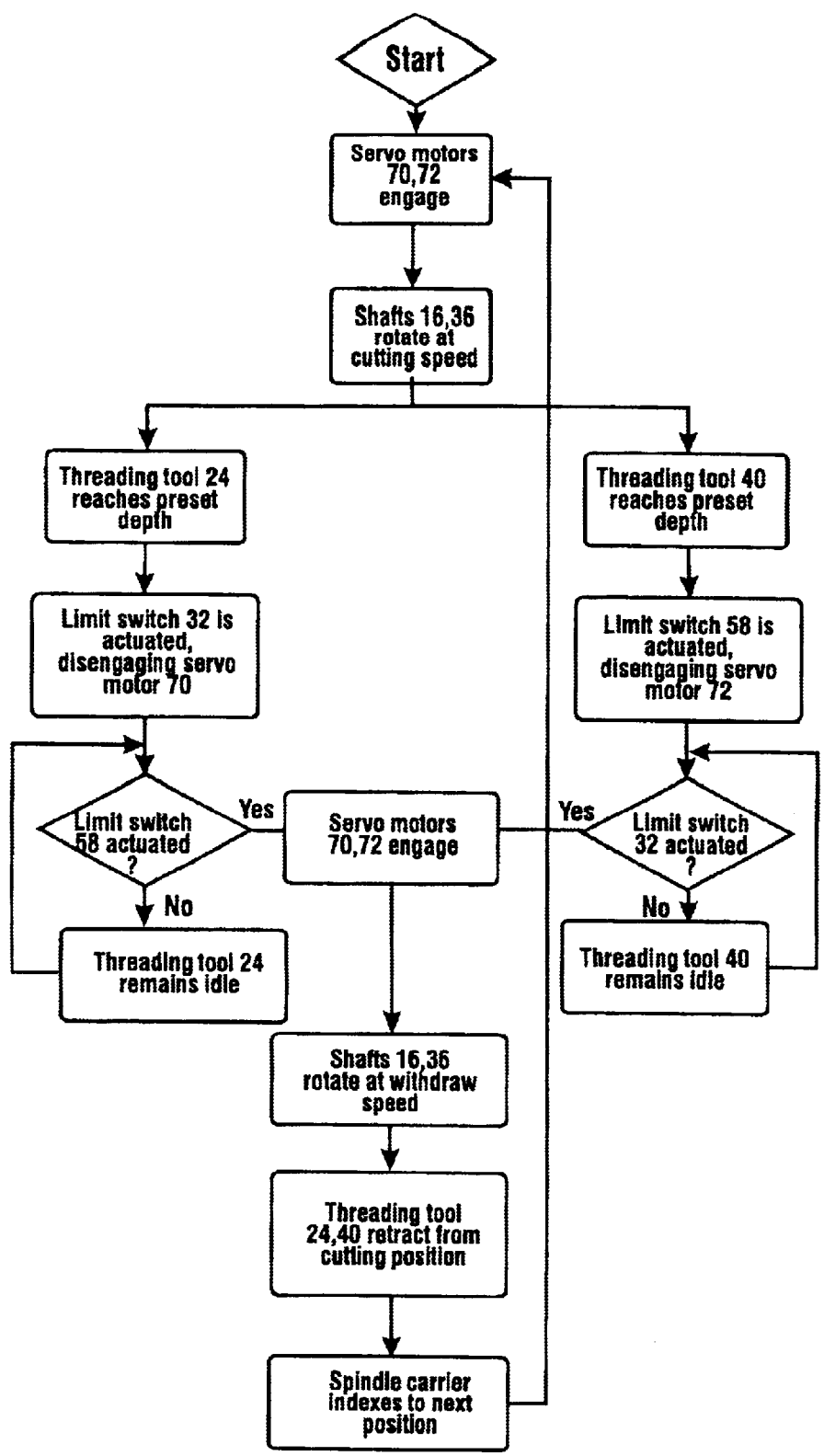
FIG. 18 is a flow diagram of the threading operation shown in FIGS. 15–17 and 15A–17A.

As in the first embodiment both threading tools 24, 40 have a switch actuator to engage a limit switch so as to indicate that each threading tool is in either the fully forward or the fully retracted position. The multiple spindle machine is set up based on both threading operations being completed approximately simultaneously, but without the need for extreme precision required in the prior art. Additionally, as the threading tools wear, they will typically wear at different rates, but will not require adjustment of the machine to continue its operation. A flow diagram of the threading operation of the alternative embodiment is shown in FIG. 18.

Thus the multiple spindle machine dual threading apparatus and method of the present invention achieves the above stated objectives, eliminates difficulties encountered in the use of prior devices, solves problems and attains the desirable results described herein.

In the foregoing description certain terms have been used for brevity, clarity and understanding. However no unnecessary limitations are to be implied therefrom because such terms are for descriptive purposes and are intended to be broadly construed. Moreover the descriptions and illustrations herein are by way of examples and the invention is not limited to the details shown and described. Further in the following claims any feature that is described as a means for performing a function shall be construed as encompassing any means capable of performing that function and shall not be limited to the particular means shown in the foregoing description or mere equivalents.

Having described the features, discoveries and principles of the invention, the manner in which it is constructed and operated and the advantages and useful results attained; the new and useful structures, devices, elements, arrangements, parts, combinations, systems, equipment, procedures, methods, operations and relationships are set forth in the appended claims.

What is claimed is:

1. A plural machining apparatus for a multiple spindle machine, wherein the multiple spindle machine includes a first machining tool and a second machining tool, the apparatus comprising:
   a first detector, wherein the first detector is operative to detect the first machining tool reaching a selected position of the first machining tool;
   a second detector, wherein the second detector is operative to detect the second machining tool reaching a selected position of the second machining tool;
   a controller, wherein the controller is in operative connection with the first detector and the second detector;
   wherein the controller is operative to determine the earlier of the first or second machining tool reaching its selected position.

2. The apparatus according to claim 1 further comprising:
   a first engagement device selectively operative to engage and disengage the first machining tool;
   a second engagement device selectively operative to engage and disengage the second machining tool;
   wherein the controller is further in operative connection with the first engagement device and the second engagement device;
   wherein the controller is operative to cause the earlier of the first or second machining tool reaching its selected position to be disengaged from its respective engagement device.

3. The apparatus according to claim 2 wherein the controller is operative to cause disengagement until the later of the first or second machining tool reaches its selected position, whereupon the controller is operative to cause engagement of the first and second engagement devices with the respective first and second machining tools, the first and second machining tools are prepared to be retracted from their machining positions, and the multiple spindle machine is prepared to be indexed.

4. A plural machining apparatus for a multiple spindle machine, wherein the multiple spindle machine includes a first machining tool and a second machining tool, the apparatus comprising:
   a first detector, wherein the first detector is operative to detect the first machining tool reaching a selected position of the first machining tool;
   a second detector, wherein the second detector is operative to detect the second machining tool reaching a selected position of the second machining tool;
   a first engagement device selectively operative to engage and disengage the first machining tool, wherein the first engagement device comprises a first machining clutch;
   a second engagement device selectively operative to engage and disengage the second machining tool, wherein the second engagement device comprises a second machining clutch;
   a controller, wherein the controller is in operative connection with the first detector and the second detector and the first engagement device and the second engagement device;
   wherein the controller is operative to determine the earlier of the first or second machining tool reaching its selected position;
   wherein the controller is operative to cause the earlier of the first or second machining tool reaching its selected position to be disengaged from its respective engagement device;
   wherein the controller is operative to cause disengagement until the later of the first or second machining tool reaches its selected position, whereupon the controller is operative to cause engagement of the first and second engagement devices with the respective first and second machining tools, the first and second machining tools are prepared to be retracted from their machining positions, and the multiple spindle machine is prepared to be indexed.

5. The apparatus according to claim 3 wherein the first engagement device comprises a first servo motor, and the second engagement device comprises a second servo motor.

6. The apparatus according to claim 3 wherein the first detector comprises a first limit switch, and wherein the second detector comprises a second limit switch.

7. The apparatus according to claim 6 wherein the first limit switch is operative to engage a first switch actuator attachable to the first machining tool, and wherein the second limit switch is operative to engage a second switch actuator attachable to the second machining tool.

8. The apparatus according to claim 4 wherein the multiple spindle machine comprises:
   a high speed clutch, wherein the high speed clutch is selectively operative to engage and disengage a motor to a high speed drive train, whereby when the high speed clutch is engaged, machining components are operated at a high speed;
   a low speed clutch, wherein the low speed clutch is selectively operative to engage and disengage a motor to a low speed drive train, whereby when the low speed clutch is engaged, machining components are operated at a low speed, wherein the low speed is at a speed slower than the high speed;
   wherein the controller is further in operative connection with the high speed clutch and the low speed clutch;
   whereupon the later of the first or second machining tool reaching its selected position, the low speed clutch is disengaged, the high speed clutch is engaged, the first and second machining clutches are engaged with the respective first and second machining tools, the first and second machining tools are retracted from their machining positions, and the multiple spindle machine is indexed.

9. A plural machining clutch apparatus for a multiple spindle machine, wherein the multiple spindle machine includes:
   a motor;
   a power drive train, operatively driven by the motor at either a low speed by a low speed drive train or at high speed by a high speed drive train;

a main drum shaft driven by the power drive train, wherein machining components of the multiple spindle machine are operative responsive to the main drum shaft;

a high speed clutch selectively operative to engage and disengage the motor to the high speed drive train, whereby when the high speed clutch is engaged, machining components are operated at a high speed;

a low speed clutch selectively operative to engage and disengage the motor to the low speed drive train, whereby when the low speed clutch is engaged, machining components are operated at a low speed, wherein the low speed is at a speed slower than the high speed;

wherein the plural machining apparatus comprises:
a first machining clutch selectively operative to engage and disengage a first machining tool;
a second machining clutch selectively operative to engage and disengage a second machining tool;
a first detector, wherein the first detector is operative to detect the first machining tool reaching a selected position of the first machining tool;
a second detector, wherein the second detector is operative to detect the second machining tool reaching a selected position of the second machining tool;
a controller in operative connection with the first machining clutch, first detector, second machining clutch, second detector, high speed clutch and low speed clutch, wherein the controller is operative to cause the earlier of the first or second machining tool reaching its respective selected position to be disengaged by its respective machining clutch until the later of the first or second machining tool reaches its respective selected position, whereupon the low speed clutch is disengaged, the high speed clutch is engaged, the first and second machining clutches are engaged with the respective first and second machining tools, the first and second machining tools are retracted from their machining positions, and the multiple spindle machine indexes to its next position.

10. The apparatus according to claim 9 wherein the first detector comprises a first limit switch, and wherein the second detector comprises a second limit switch.

11. The apparatus according to claim 10 wherein the first limit switch is in operative connection with the controller, and wherein the second limit switch is in operative connection with the controller.

12. The apparatus according to claim 11 wherein the first limit switch is operative to engage a first switch actuator attached to the first machining tool, and wherein the second limit switch is operative to engage a second switch actuator attached to the second machining tool.

13. The apparatus according to claim 12 whereupon engagement of a first limit switch with the first switch actuator, a signal is sent to the controller indicating that the first machining tool has reached its selected position, and whereupon engagement of a second limit switch with the second switch actuator, a signal is sent to the controller indicating that the second machining tool has reached its selected position.

14. A method of operation of a plural machining apparatus for a multiple spindle machine, the plural machining apparatus comprising:
a first detector, wherein the first detector is operative to detect the first machining tool reaching a selected position of the first machining tool;
a second detector, wherein the second detector is operative to detect the second machining tool reaching a selected position of the second machining tool;
a controller, wherein the controller is in operative connection with the first detector and the second detector;
wherein the controller is operative to determine the earlier of the first or second machining tool reaching its selected position; the method comprising the steps of:
detecting with the first detector a position of the first machining tool;
detecting with the second detector a position of the second machining tool; and
determining with the controller the earlier of the first or second machining tool reaching its selected position.

15. A method of operation of a plural machining apparatus for a multiple spindle machine, the plural machining apparatus comprising:
a first detector, wherein the first detector is operative to detect the first machining tool reaching a selected position of the first machining tool;
a second detector, wherein the second detector is operative to detect the second machining tool reaching a selected position of the second machining tool;
a first engagement device selectively operative to engage and disengage the first machining tool;
a second engagement device selectively operative to engage and disengage the second machining tool;
a controller, wherein the controller is in operative connection with the first detector and the second detector and the first engagement device and the second engagement device;
wherein the controller is operative to determine the earlier of the first or second machining tool reaching its selected position;
wherein the controller is operative to cause the earlier of the first or second machining tool reaching its selected position to be disengaged from its respective engagement device;
the method comprising the steps of:
detecting with the first detector a position of the first machining tool;
detecting with the second detector a position of the second machining tool;
determining with the controller the earlier of the first or second machining tool reaching its selected position;
disengaging the respective engagement device from the earlier machining tool;
determining that the later machining tool has reached its selected position;
engaging the respective engagement device with the earlier machining tool;
retracting the first and second machining tools from their machining positions; and indexing the multiple spindle machine.

16. The method according to claim 15 wherein the first engagement device includes a first machining clutch, and the second engagement device includes a second machining clutch;
wherein the disengaging step comprises disengaging the respective machining clutch from the earlier machining tool;
wherein the engaging step comprises engaging the respective machining clutch with the earlier machining tool.

17. The method according to claim 15 wherein the first engagement device includes a first servo motor, and the second engagement device includes a second servo motor;
wherein the disengaging step comprises de-energizing the respective servo motor of the earlier machining tool;

wherein the engaging step comprises energizing the respective servo motor of the earlier machining tool.

18. The method according to claim 15
wherein the first detector includes a first limit switch;
wherein the first limit switch is in operative connection with the controller;
wherein the first machining tool includes a first switch actuator attached thereto;
wherein the step of detecting the first machining tool reaching a selected position of the first machining tool comprises detecting movement of the first limit switch by engagement with the first switch actuator.

19. The method according to claim 18
wherein the second detector includes a second limit switch;
wherein the second limit switch is in operative connection with the controller;
wherein the second machining tool includes a second switch actuator attached thereto;
wherein the step of detecting the second machining tool reaching a selected position of the second machining tool comprises detecting movement of the second limit switch by engagement with the second switch actuator.

20. The method according to claim 16 wherein the multiple spindle machine comprises:

a high speed clutch, wherein the high speed clutch is selectively operative to engage and disengage a motor to a high speed drive train, whereby when the high speed clutch is engaged, machining components are operated at a high speed;

a low speed clutch, wherein the low speed clutch is selectively operative to engage and disengage a motor to a low speed drive train, whereby when the low speed clutch is engaged, machining components are operated at a low speed, wherein the low speed is at a speed slower than the high speed;

wherein the controller is further in operative connection with the high speed clutch and the low speed clutch, wherein the step of retracting comprises:

disengaging the low speed clutch upon the later machining tool reaching its selected position; and engaging the high speed clutch.

* * * * *

UNITED STATES PATENT AND TRADEMARK OFFICE
CERTIFICATE OF CORRECTION

PATENT NO. : 6,626,072 B1
DATED : September 30, 2003
INVENTOR(S) : Robert M. Kalinsky et al.

It is certified that error appears in the above-identified patent and that said Letters Patent is hereby corrected as shown below:

Column 1,
Line 3, insert the following paragraph:
-- This Application claims the benefit of U.S. Provisional Application No. 60/142,701 filed July 7, 1999. --

Signed and Sealed this

Second Day of March, 2004

JON W. DUDAS
*Acting Director of the United States Patent and Trademark Office*